United States Patent
Voldsbekk

(10) Patent No.: US 9,244,184 B2
(45) Date of Patent: *Jan. 26, 2016

(54) RIGID-STEM LEAD-IN METHOD AND SYSTEM

(71) Applicant: PGS Geophysical AS, Lysaker (NO)

(72) Inventor: Rune Sindre Voldsbekk, Drammen (NO)

(73) Assignee: PGS Geophysical AS, Oslo (NO)

( * ) Notice: Subject to any disclaimer, the term of this patent is extended or adjusted under 35 U.S.C. 154(b) by 342 days.

This patent is subject to a terminal disclaimer.

(21) Appl. No.: 13/729,248

(22) Filed: Dec. 28, 2012

(65) Prior Publication Data

US 2014/0185411 A1 Jul. 3, 2014

(51) Int. Cl.
*G01V 1/38* (2006.01)
*B63B 21/66* (2006.01)
*G01V 1/20* (2006.01)
*B63B 21/56* (2006.01)

(52) U.S. Cl.
CPC *G01V 1/38* (2013.01); *G01V 1/201* (2013.01); *G01V 1/3843* (2013.01); *B63B 21/56* (2013.01); *B63B 21/66* (2013.01); *G01V 2001/204* (2013.01)

(58) Field of Classification Search
CPC ........... G01V 1/38; B63B 21/56; B63B 21/66
USPC ...................... 367/20, 154; 114/242, 249, 250
See application file for complete search history.

(56) References Cited

U.S. PATENT DOCUMENTS

| 3,452,327 | A | * | 6/1969 | Clynch .......................... 367/173 |
| 3,794,965 | A | * | 2/1974 | Charske .......................... 367/18 |
| 4,108,101 | A | * | 8/1978 | Schirtzinger ................. 114/245 |
| 4,781,140 | A |   | 11/1988 | Bell et al. |
| 4,881,210 | A | * | 11/1989 | Myers et al. .................. 367/173 |
| 5,673,644 | A |   | 10/1997 | Vanasse et al. |
| 6,069,841 | A |   | 5/2000 | Johnston |
| 6,775,204 | B2 |  | 8/2004 | Scott |
| 6,903,998 | B2 |  | 6/2005 | Vaage |
| 7,028,988 | B2 |  | 4/2006 | Scott |
| 7,142,481 | B1 |  | 11/2006 | Metzbower et al. |
| 7,167,412 | B2 |  | 1/2007 | Tenghamn |
| 7,221,619 | B1 |  | 5/2007 | George |

(Continued)

FOREIGN PATENT DOCUMENTS

| WO | WO02/29948 A1 | 4/2002 |
| WO | WO2004/036252 A1 | 4/2004 |
| WO | WO2004/079398 A1 | 9/2004 |

OTHER PUBLICATIONS

UK Search Report mailed Mar. 19, 2004, in Patent application No. GB1322651.9. 3 pages.

*Primary Examiner* — Ian J Lobo

(57) ABSTRACT

Disclosed are methods and systems for using a rigid-stem lead-in assembly comprising a plurality of interconnected rigid stems in a marine geophysical survey. An embodiment discloses a method of towing a survey device from a survey vessel, comprising: coupling the survey device to the survey vessel with a lead-in comprising a rigid-stem lead-in assembly, the rigid-stem lead-in assembly comprising a plurality of rigid stems that are interconnected and each comprise a stem both defining one or more interior chambers; and towing the survey device through a body of water. Also disclosed are marine geophysical survey methods and marine survey systems.

22 Claims, 9 Drawing Sheets

(56) References Cited

U.S. PATENT DOCUMENTS

| | | |
|---|---|---|
| 7,260,024 B2 | 8/2007 | Goujon et al. |
| 7,298,672 B1 | 11/2007 | Tenghamn et al. |
| 7,352,654 B2 | 4/2008 | Goujon et al. |
| 7,426,439 B2 | 9/2008 | Ozdemir et al. |
| 7,641,421 B2 | 1/2010 | Roodenburg et al. |
| 7,737,698 B2 | 6/2010 | Tenghamn et al. |
| 7,778,114 B2 | 8/2010 | Goujon et al. |
| 7,800,976 B2 | 9/2010 | Stokkeland et al. |
| 7,834,632 B2 | 11/2010 | Tenghamn et al. |
| 7,974,152 B2 | 7/2011 | Tenghamn |
| 8,021,080 B2 | 9/2011 | Frivik et al. |
| 8,102,731 B2 | 1/2012 | Cambois |
| 8,267,031 B2 | 9/2012 | Austad |
| 2007/0266804 A1 | 11/2007 | Goujon et al. |
| 2008/0267009 A1 | 10/2008 | Frivik et al. |
| 2009/0092006 A1 | 4/2009 | Teigen et al. |
| 2009/0161487 A1 | 6/2009 | Kjellgren et al. |
| 2010/0149910 A1* | 6/2010 | Martin ............................. 367/17 |
| 2010/0170428 A1* | 7/2010 | Toennessen .................. 114/249 |
| 2010/0322565 A1 | 12/2010 | George et al. |
| 2012/0081994 A1 | 4/2012 | Husom et al. |
| 2014/0185409 A1 | 7/2014 | Voldsbekk |
| 2014/0185410 A1* | 7/2014 | Voldsbekk ....................... 367/20 |
| 2014/0185412 A1 | 7/2014 | Voldsbekk |
| 2014/0254310 A1 | 9/2014 | Voldsbekk |

\* cited by examiner

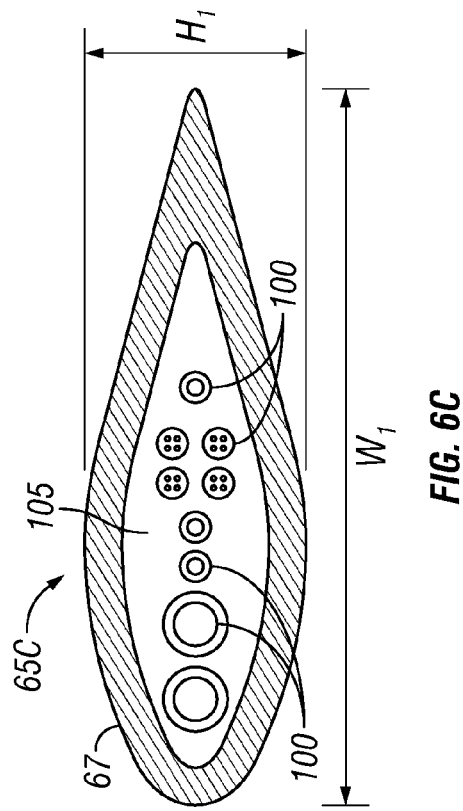
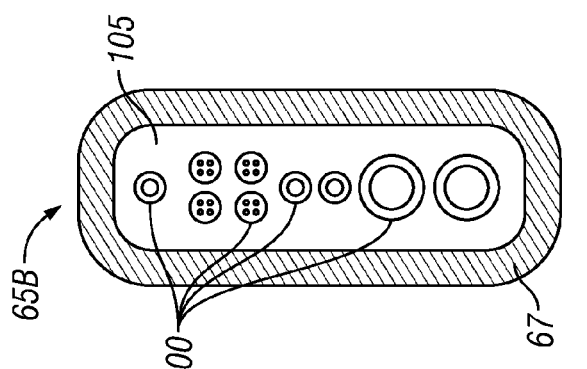
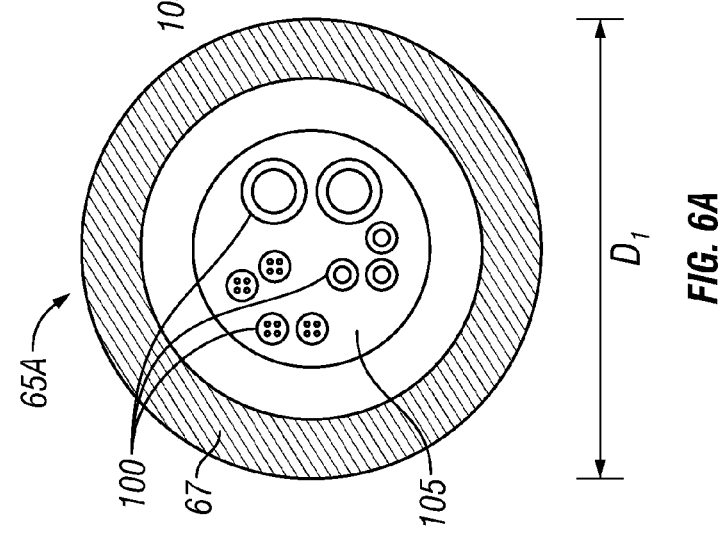

RIGID-STEM LEAD-IN METHOD AND SYSTEM

BACKGROUND

The present invention relates generally to the field of marine geophysical surveying. More particularly, in one or more embodiments, this invention relates to using a rigid-stem lead-in comprising a plurality of interconnected rigid stems in a marine geophysical survey.

Techniques for marine surveying include marine geophysical surveying, such as seismic surveying and EM surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth in a body of water, typically above the seafloor. One or more geophysical sensor streamers also may be towed in the water at selected depths by the same or a different vessel. The streamers are essentially long cables having geophysical sensors disposed thereon at spaced-apart locations. A lead-in typically couples the sensor streamer to the survey vessel. Actuation of the energy source emits an energy field into the body of water. The energy field interacts with the rock formations below the water bottom with changes in the energy field due to this interaction detected by the geophysical sensors positioned on the streamers. The detected energy is used to infer certain properties of the subsurface rock, such as structure, mineral composition and fluid content, thereby providing information useful in the recovery of hydrocarbons.

Since the introduction of three-dimensional seismic surveying, there has been interest in towing wider and longer spreads of sensor streamers, which require more cables, larger lateral separation, deeper tows, and longer or bigger cables with more and more external equipment. To achieve the desired lateral spread between the sensor streamers, spreading devices have been used, which may include lateral depressors, such as inclined plates or wings. Some lateral depressors typically the larger one may be connected to the survey vessel using a separate tension member while others may be attached to the lead-in connecting the sensor streamer to the survey vessel. For towing sensor streamers, the lead-in can take the shape of an umbilical with or without fairing connected to one or more wings (also reformed to as depressors) for achievement of both lateral, vertical, or combined offset from the vessel trajectory and may be used in combination with weights, flotation devices, and sometimes active propulsion to achieve deep towing/large offsets.

When towing sensor streamers up to several kilometers in length and from 1 to 3 inches in diameter, as may be done in three-dimensional surveying, a tension of a little over 1 ton may be normally required at the industry standard of 5 knots transversal speed. The tension increases with increased speed. In order to keep the cables at as lateral spread of more than 1,000 meters, the tension often exceeds 10 tons on the outermost lateral depressor because it typically sees its own drag and the drag from the lead-in or tow wire in addition to the required lateral lift for the sensor streamer. The tension will typically be the highest in the outermost members and the surveys with the widest or largest spreads. For the purpose of storing these lead-ins and other tension members and to be able to deploy as much cable as desired while stopping at any position under tension, a high-torque and often brake-able winch may be used. In instances where the lateral depressor is not connected to a sensor streamer, as pure wire with high strength and smaller bend radius than for the lead-ins may be used for the tension member. In other instances, a steel, or Aramid-armored umbilical cable with copper and fiber fibers inside has been used.

However, these cables often traverse through the water with up to 45° of cross flow. Uneven water flow around the cables may produce alternating shedding forces which may cause transverse vibrations known as "strumming" or "vortex index vibrations" in the cables. Strumming may be problematic with lead-ins as the adding drag due to strumming results in higher load with corresponding lower lifting performance on the lead-ins. In addition, the turbulent flow within the water caused by the strumming generates acoustic noise that may interfere with data collection. Strumming may further generate stresses at equipment connection points and can accelerate equipment failure. A number of techniques have been developed to reduce problems associated with strumming as a cable is towed through the water. One technique involves attachment of fairings to the cables to reduce strumming in the water. There are number of different types of fairings in use, including hard fairings and hairy or fabric fairings. Hard fairings may include a streamlined shell or other structure attached to sections of the cable. Drawbacks to hard fairings may include increased complexity of the cable-handling system as a faired cable cannot be stored directly on a drum when large or in long lengths. Hairy or fabric fairings may include fairing hairs attached to the cable. While hair or fabric fairings may remove vibration, very little reduction in drag may be achieved as the reduced drag is typically compensated by the increased diameter/area of the faired cable.

Accordingly, there is a need for improved techniques for reducing drag forces which may reduce strumming noise interfering with data collection and increase towing efficiency.

BRIEF DESCRIPTION OF THE DRAWINGS

These drawings illustrate certain aspects of some of the embodiments of the present invention and should not be used to limit or define the invention.

FIGS. 6A through 6C illustrate rigid-stems having different cross-sections in accordance with embodiments of the present invention.

DETAILED DESCRIPTION

The present invention relates generally to the field of marine geophysical surveying. More particularly in one or more embodiments, this invention relates to using a rigid-stem lead-in comprising a plurality of interconnected rigid stems in a marine geophysical survey. A rigid-stem lead-in assembly in accordance with embodiments of the present invention may be used to couple a sensor streamer to a survey vessel. A rigid-stem lead-in assembly in accordance with embodiments of the present invention may also be used to couple other towed devices, such as energy sources, sensor assemblies, samples, or transducers. The rigid stems may be assembled on a survey vessel to form one or more rigid-stem lead-in assemblies that can be deployed in a body of water. The rigid stems may include wings that create lateral lift as moved through the water to place the front ends of the sensor streamers at their lateral position. The rigid stems may have a round cross-section or have other shapes, such as a wing-shaped cross-section for a streamlined, low-drag profile.

Figure 1:
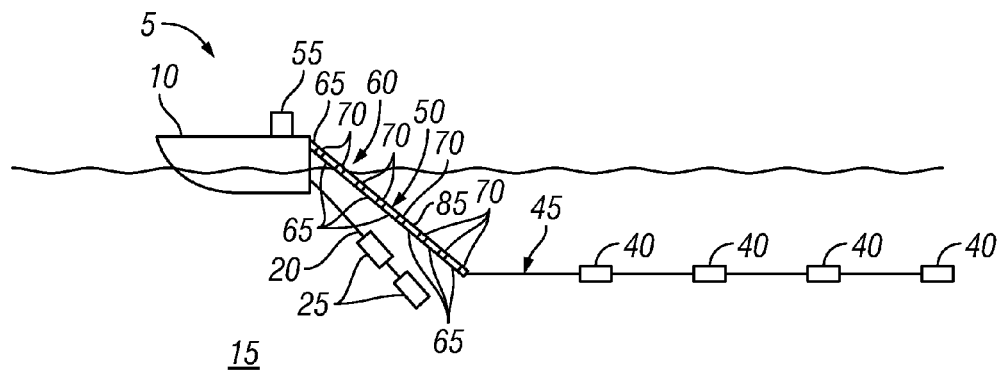
FIG. 1 illustrates an example embodiment of a marine geophysical survey system that comprising a sensor streamer having a rigid-stem lead-in assembly.

FIG. 1 illustrates a marine geophysical survey system 5 in accordance with embodiments of the present invention. In the illustrated embodiment, the marine geophysical survey system 5 may include a survey vessel 10 that moves along the surface of a body of water 15, such as a lake or ocean. The survey vessel 10 or a different vessel (not shown) can tow a source cable 20 that includes one or more energy sources 25. As illustrated, the energy sources 25 may be towed above the water bottom 35, wherein the energy sources 25 are disconnected from the water bottom 35. In some embodiments (not shown), one or more of the energy sources 25 may be mounted to the hull of the survey vessel 10. The energy sources 25 may be any selectively actuable sources suitable for subsurface geophysical surveying, including without limitation seismic air guns, water guns, vibrators or arrays of such devices, or one or more electromagnetic field transmitters. As energy is emitted by the energy sources 25, it travels downwardly through the body of water 15 and rock formations 30 below the water bottom 35.

In the present example, a plurality of geophysical sensors 40 may be disposed at spaced-apart locations along the sensor streamer 45. A lead-in 50 may couple the sensor streamer 45 to the survey vessel 10. The type of geophysical sensors 40 is not a limit on the scope of the present invention and may be, without limitation, seismic sensors such as geophones, hydrophones, or accelerometers, or electromagnetic field sensors, such as electrodes or magnetometers. In one embodiment, the sensor streamer 45 may include a lateral force and depth ("LFD") control device (not shown) configured to, for example, regulate streamer depth so that the sensor streamer 45 may be kept as level as possible while towed through the body of water 15. The LFD control device may be any of a variety of different devices suitable for regulating streamer depth, including "birds" having variable-incidence wings. The geophysical sensors 40 may generate response signals, such as electrical or optical signals, in response to detecting energy emitted from the energy sources 25 after the energy has interacted with the rock formations 30. Signals generated by the geophysical sensors 40 may be communicated to equipment on the survey vessel 10, shown generally at 55 and referred to for convenience as a "recording system." The recording system 55 typically includes devices (none shown separately) for navigating the survey vessel 10, for actuating the energy sources 25, for example, electrical controller with swept frequency alternating current or other signal, and for recording signals generated by the geophysical sensors 40.

The lead-in line 50 may be used, for example, to deploy the sensor streamer 45 from the survey vessel 10 and to maintain the sensor streamer 45 at a selected distance behind the survey vessel 10. As illustrated, the lead-in 50 may be coupled to the sensor streamer 45 at an axial end closed to the survey vessel 10 ("forward end"). The lead-in 50 may include, for example, a rigid-stem lead-in assembly 60. In some embodiments (not illustrated), more than one rigid-stem lead-in assembly 60 may be coupled end-to-end to form the lead-in 50. The rigid-stem lead-in assembly 60 may comprise a plurality of interconnected rigid stems 65 coupled end-to-end. In some embodiments, stem joints 70 may be disposed at the intersection of adjacent rigid stems 65 for mechanically joining the adjacent rigid stems 65 together. While not illustrated, a stem joint 70 may not be used, in some embodiments, to couple at least one pair of adjacent rigid stems 65 leaving an open joint. In some embodiments, components, such as sensors, electronics, actuators, transducers and other devices, may be disposed in the rigid stems 65. In some embodiments, the rigid-stem lead-in assembly 60 may include one or more inline retrievers that can be used for retrieval, for example, in the event of a damaged or detached streamer or lead-in assembly 60. The inline retriever may include a ballasting system, for example, to lift the rigid-stem lead-in assembly 60 to a different depth or even the surface. Inline retrieval may be needed in a number different circumstances such as if wings or other device on the rigid-stem lead-in assembly 60 or the sensor streamer 45 have stopped working, there is a risk of entanglement, or if service/repair is needed and retrieval cannot be performed by another technique. In some embodiments, the lead-in 50 may communicate power and/or signals between the recording system 55 and the various electronic components (e.g., geophysical sensors 40) on the sensor streamer 45. For example, lead-in termination 75 at an axial end furthest away from the survey vessel 10 ("distal end") of the lead-in 50. Electrical and/or optical connection between the recording system 55 and electrical components on the sensor streamer 45 may be made through the lead-in termination 75. In some embodiments, the lead-in termination 75 may flexibly couple the lead-in 50 to the sensor streamer 45 so that the sensor streamer 45 can extend in a different direction in the body of water 15 than the lead-in 50. While FIG. 1 illustrates, the sensor streamer 45 as a cable, it should be understood that the sensor streamer 45 may be have other configurations, including, for example, being formed from one or more rigid-stem assemblies coupled end-to-end.

The configuration of the energy sources 25 and sensor streamer 45 shown in FIG. 1 is only meant to illustrate an example embodiment of the marine geophysical survey system 5. In alternative embodiments (not shown), the marine geophysical survey system 5 may include additional vessels which may tow energy sources in addition to the energy sources 25 shown on FIG. 1. The energy sources 25 may also be towed by a vessel different than the survey vessel 10 that tows the sensor streamer 45. In some embodiments, the survey vessel 10 may tow a plurality of sensor streamers 45 arranged in a laterally spaced-apart array. For example, in some embodiments, 8 or more laterally spaced-apart sensor streamers 45 may be towed by the survey vessel 10, while in other embodiments, as many as 26 or more laterally spaced-apart sensor streamers 45 may be towed by survey vessel 10.

Figure 2:
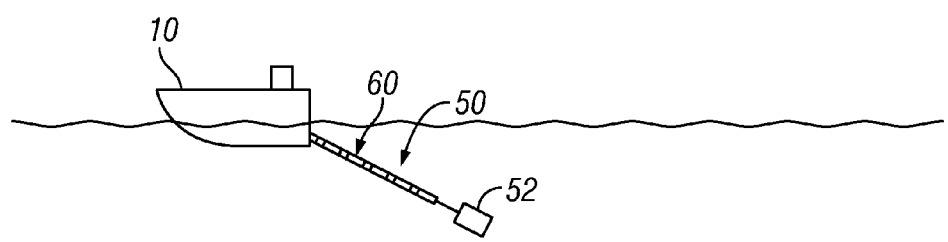
FIG. 2 illustrates an example embodiment that use a rigid-stem lead-in assembly for coupling a survey device to a survey vessel.

While FIG. 1 illustrates use of the rigid-stem lead-in assembly 60 for coupling the sensor streamer 45 to the survey vessel 10, it should understood that embodiments of the present invention may be used to couple other survey devices that may be used for measuring properties of the water itself or actively/passively measuring properties of the Earth. Non-limiting examples of such survey devices include energy sources, sensor assemblies, samplers, and tranducers, among others. FIG. 2 illustrates use of lead-in 50 comprising rigid-stem lead-in assembly 60 for coupling one or more survey devices 52 to the survey vessel 10.

Figure 3:
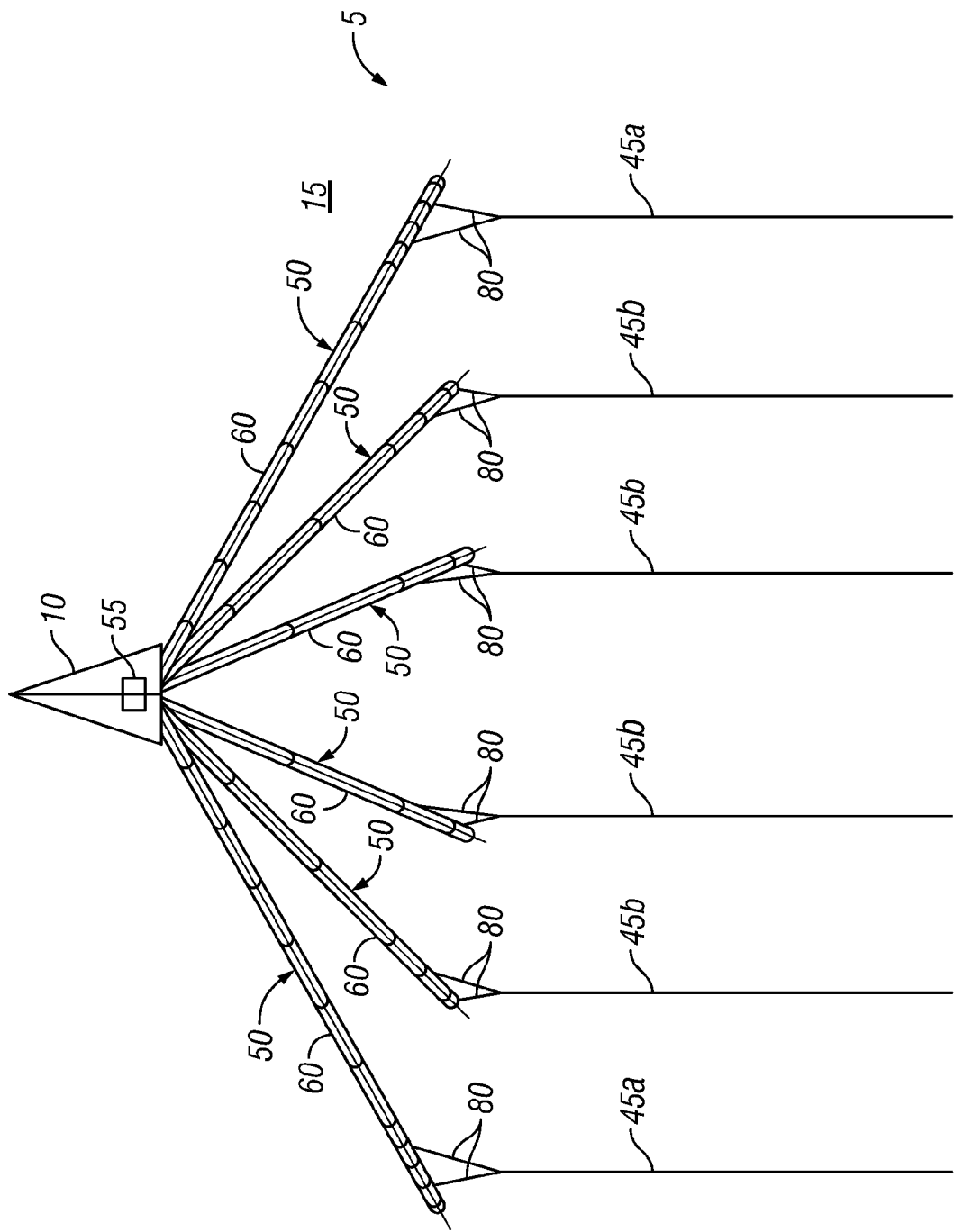
FIG. 3 illustrates another example embodiment of a marine geophysical survey system that comprises multiple sensor streamers having rigid-stem lead-in assemblies.

FIG. 3 illustrates a marine geophysical survey system 5 that utilizes lead-ins 50 that each comprises a rigid-stem lead-in assembly 60 to couple a plurality of sensor streamers, such as outer sensor streamers 45a and inner sensor streamers 45b, to the survey vessel 10. As illustrated, the marine geophysical survey system 5 may include a plurality of laterally spaced-apart sensor streamers 45a, 45b on which the geophysical sensors (not shown) may be disposed at spaced-apart locations. "Lateral" or "laterally," in the present context, means transverse to the direction of the motion of the survey vessel 10. In the illustrated embodiment, the marine geophysical survey system 5 includes two outer sensor streamers 45a and four inner sensor streamers 45b. Lines 80, such as a roper or other cable, may be used to secure the forward end of the sensor streamers 45a, 45b to the lead-ins 50. As illustrate, spreader lines or some other type of lateral connector that extends between the outer sensor streamers 45a may be omitted in accordance with embodiments of the present invention as each rigid-stem lead-in assembly 60 can be selectively placed in a desired lateral position. Accordingly, each of the rigid-stem lead-in assembly can be independently driven up, down, or laterally. In alternative embodiments, spreader lines or some other type of lateral connector (not shown) may extend between the outer sensor streamers 45a. In some embodiments, only the lead-ins 50 to the two outer sensor streamers 45a (as opposed to the lead-ins 50 to the inner sensor streamers 45b) comprise rigid-stem lead-in assemblies 60.

In one embodiment, the methods and systems may be used to tow sensor streamers 45a, 45b at a depth of up to about 25 meters or more. In some embodiments, the sensor streamers 45a, 45b may be towed at as depth of at least about 25 meters and at a depth of at least about 100 meters, in another embodiment. In one particular embodiment, the sensor streamers 45a, 45b may be towed at a depth up to about 500 meters or more. Advantageously, example embodiments of the rigid-stem lead-in assemblies 60 may be used to achieve larger depths for the sensor streamers 45a, 45b without the drawbacks to having an increase in vertical cable lengths and drag for conventional lead-ins formed from cables, as well as problems associated with horizontal line restrictions. In some embodiments, the sensors streamers 45a, 45b may be towed at two or more different depths. In one embodiment, the methods and systems may be used to achieve a spread between the sensor steamers 45a, 45b at the outermost lateral positions (e.g., the outer sensor streamers 45a) of at least about 150 meters, at least about 500 meters in another embodiment, and at least about 1,000 meters in yet another embodiment. In one particular embodiment, the methods and systems may be used to achieve a spread between the sensor streamers 45a, 45b at the outermost lateral positions of up to about 1,500 meters or more.

The lead-ins 50 comprising the rigid-stem lead-in assemblies 60 may be deployed from the survey vessel 10 using any suitable technique. For example, a rigid-stem lead-in assembly 60 may be assembled and deployed from the survey vessel 10. Prior to deployment, the distal end of the rigid-steam lead-in assembly 60 may be coupled to the forward end of the corresponding one of the sensor streamers 45a, 45b. The rigid-stem lead-in assembly 60 may be formed by connecting a longitudinal end of one of the rigid stems 65 to a corresponding longitudinal end of an adjacent one of the rigid stems 65. A linear-tensioning machine (not shown) disposed on the survey vessel 10 may deploy the rigid-stem assembly 60 into the body of water 15. Additional rigid stems 65 may be coupled as the linear-tensioning machine (not shown) deploys the rigid-stem lead-in assembly 60 into the body of water 15. In some embodiments, the liner-tensioning machine may comprise one or more wheel pairs that hold the rigid-stem assembly 65 in tension as it is deployed. Other suitable linear-tensioning machines may be used that are capable of holding the rigid-stem assembly 65, including clamps that engage shoulders on the rigid stems 65 or grooves or chamfers on the rigid stems 65 clamps in belts or in pistons or other linear machines that apply force to the rigid stems 65; a hook or other attachment device on a rope coupled to an attachment on the rigid stems 65, or pins that enter holes on the rigid stems 65 and which may be spring driven. The liner-tensioning machine may also be used for retrieval of the rigid-stem assembly 65.

Figure 4:
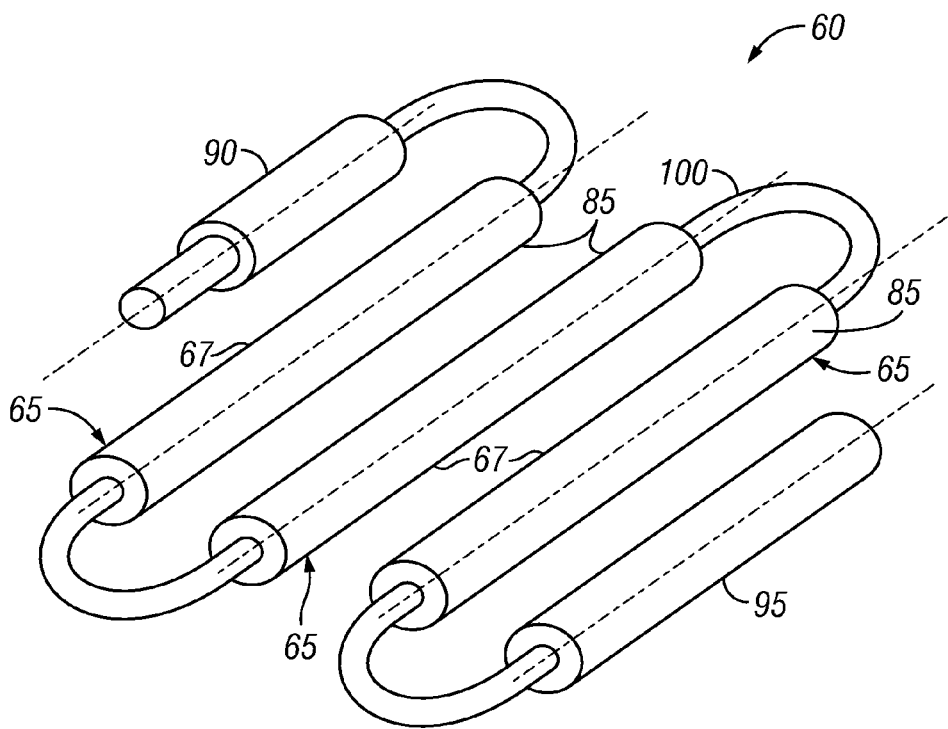
FIG. 4 illustrates a rigid-stem lead-in assembly in a de-coupled configuration in accordance with embodiments of the present invention.

Referring now to FIG. 4, a rigid-stem lead-in assembly 60 is illustrated in more detail in accordance with embodiments of the present invention. The rigid-stem lead-in assembly 60 may be a structure for a number of items, including feed lines, gas lines, optical and/or electrical signals, power, external devices, geophysical sensors, tension sensors, and geophysical sources. The rigid-stem lead-in assembly 60 is shown in a de-coupled configuration. In some embodiments, the rigid-stem lead-in assembly 60 may be stored on the survey vessel 15 in the de-coupled configuration and assembled prior to deployment into the body of water 15.

As illustrated, the rigid-stem lead-in assembly 60 may comprise a plurality of rigid stems 65. The rigid-stem lead-in assembly 60 (when assembled) is characterized as being rigid in that it has as bending, torsion, and/or inline stiffness than can be maintained for considerable lengths, for example, up to about 10 meters, about 50 meters, about 100 meters, or even longer. Unlike cables and structures that have been used previously as lead-ins, the rigid-stem assembly 60 should not exhibit catenary behavior over at least portions of the length, but should rather exhibit elastic behavior with deformation according to deformation of beams and not sinus hyperbolic or parabolic as for cables and the like. Accordingly, the rigid-stem lead-in assembly 60 when assembled cannot be stored and deployed from a drum, but rather may utilize a movable or fixed attachment point (e.g., such as a detensioning apparatus that comprises wheel pairs) for deployment from the survey vessel 10 (e.g., shown on FIG. 1). The attachment point can hold the rigid-stem lead-in assembly 60 by friction (e.g., as wheel pair) or a ring, for example. In some embodiments, the rigid-stem lead-in assembly 60 may be characterized as being rigid for a length of about 25 meters or longer wherein the rigid stems 105 have a smallest width or height of about 1 meter or less.

In some embodiments, the rigid-stem lead-in assembly 60 may have a bending stiffness of 700 Newton-square meters ("Nm$^2$") or greater over considerable lengths (e.g., over about 25 meters or more). For example, the rigid-stem lead-in assembly 60 may have a bending stiffness of 700 Nm$^2$ over substantially its entire length. Each of the rigid stems 105 may also have a bending stiffness of 700 Nm$^2$. The stiffness of 700

Nm² corresponds to a stiffness in a cantilever beam of 1-meter length fixed in one end with a load of 1 Newton in the other, deforming roughly 0.5 mm under the load. This corresponds to an aluminum (with Young's modulus of 70 GPa) tube with a 2-inch outer diameter and a thickness of 0.2 millimeters, a steel (with Young's modulus of 210 GPa) tube with a 2-inch outer diameter with a thickness of 0.03 millimeters or a circular rod with a Young's modulus of 2 GPa. Each of these items, i.e., the aluminum tube, the steel tube, and the circular rod, are examples of items with a bending, stiffness of 700 Nm². A 2-inch outer diameter typically requires 5% deformation to be wound on a 2-meter drum, which is difficult for most materials. Most rigid materials can deform a maximum of 0.1% or, in extreme cases, 1% so they cannot be wound on a drum without being wound in a wire or umbilical. Lower strength materials may be able to deform but will then be soft to enable bending.

Embodiments of the present technique are for use with materials having a stiffness that make them difficult to take the rigid-stem lead-in assembly 60 on or off a drum. The rigidity will create a bending arm for the tension under which it is taken in or out. This distance multiplied with the tension, creates the load which the rigid-stem lead-in assembly 60 has to carry in the cross section of the first point of contact with the drum and is a critical load. The point of contact can be at or before the tangential point between the drum and the rigid-stem lead-in assembly 60 wherein the tangential point corresponds to no stiffness in the rigid-stem lead-in assembly 60 and bending arm of zero. Instruments used previously in marine surveying typically have several contributors to the bending arm. For example, sensors streamers may have repeaters, connectors, sensor housings and the like that can add to the bending arm. In addition, bend restrictors may also be placed in the ends to protect the wires inside which can add to the bending arm. Lead-Ins may also have several different contributors to increased bending arm, including reinforced umbilicals, solids such as gel filled, soft rigidified or the like, and true solids such as nylons, polyurethane, or compositions. For previous instruments used in marine surveying, the bending arm has been less than 0.3 m under a load, of 3 kiloNewtons ("kN"). Some types will have almost the same bending arm for different loads (typically hinged joints and rigid bodies), other will deform much under increasing load and hence reduce bending arm (while load goes up), but all materials are limited in stillness and have a certain deformation, even though the deformation can be very difficult to detect. Embodiments of the present technique may be used with a rigid-stem lead-in assembly 60 more rigid than 700 Nm². This is more rigid than other cable or streamer-based instruments that have been used hereto for and, thus, the bending arm can become larger than 0.3 m. The rigid-stem lead-in assembly 60 is then in danger of damage or permanent deformation if subjected to 3 kN or more, hence winching is not a good handling method.

The rigid stems 65 may each comprise a stem body 67. A variety of different materials and composites may be suitable for use in the stem body 67. In some embodiments, the stem body 67 may be made from a material comprising aluminum, stainless steel, or titanium. In some embodiments, the stem body 67 may be made from a material comprising a composite, such as glass- or carbon-reinforced plastics, such as glass or carbon fibers in combination with epoxy or other resins (e.g., polyester, vinyl ester, nylon, etc.). In some embodiments, the glass fibers may include e-glass fibers. In some embodiments, the stem body 67 may be made from a material comprising a plastic, such as polyethylene, polybutylene terephthalate, polysulphone, or another suitable thermoplastic polymer. Combinations of suitable materials may also be used. One of ordinary skill in the art, with the benefit of this disclosure, should be able to select an appropriate material for the stem body 67 based on a number of factors, including selection of an appropriate stiffness-to-weight while maintaining cost and bonding ability to available resins.

In some embodiments, the stem body 67 be in the form of a pipe or other conduit that has a tubular portion that defines at least one interior chamber (e.g., interior chamber 105 shown on FIGS. 6A through 6C). In some embodiments, a buoyant filler material may be used to fill the interior chamber. One example of a suitable buoyant filler material comprises air or other suitable gas. However, other buoyant filler materials may also be used that can provide some degree of positive buoyancy for ballasting as well as electrical insulation, including foams, gelled hydrocarbon-based oil, hydrocarbon-based oil, visco-elastic polymer or other suitable electrically insulating, acoustically transparent materials, for example. In some embodiments, surface treatments may be applied to the exterior surface 85 of the stem body 67, for example, to reduce drag and antifouling. For example, one or more anti-foulant agents may be applied to the exterior surface 85. By way of further example, one or more drag-reduction treatments may be applied the exterior surface 85. While FIG. 4 illustrates the rigid stem lead-in assembly 60 having three rigid stems 65, it should be understood that embodiments of the rigid-stem lead-in assembly 60 may include more or less than three rigid stems 65, as desired for as particular application.

The rigid stems 65 may each have a length, for example, in a range of from about 1.5 meters to about 50 meters or, alternatively, from about 3 meters to about 12.5 meters. In specific embodiments, the rigid stems 65 may each have a length of about 3.125 meters, about 6.125 meters, or about 12.5 meters. The rigid stems 65 may each have an outer diameter (e.g., $D_1$ on FIG. 6A) in a range of from about 0.02 meters to about 0.2 meters or, in alternative embodiments, of about 0.04 meters to about 0.08 meters, for embodiments with a circular-shaped cross-section, for example. The rigid stems 65 may each have a width ($W_1$ on FIG. 6C) in a range of from about 0.1 meters to about 0.5 meters and a height ($H_1$ on FIG. 6C) up to about 0.4 meters, for embodiments with a wing-shaped cross-section, for example. In some embodiments, rigid stems 65 may an aspect ratio (ratio of width to height) of about 1 to about 20, about 2 to about 20, or about 1 to about 8. When assembled, the rigid-stem lead-in assembly 60 may have a length, for example, in a range of from about 50 meters to about 1000 meters. If more than one rigid-stem lead-in assembly 60 is joined end-to-end, the combined assembly may have a length in a range of from about 200 meters to about 2000 meters or longer, for example. In some embodiments, the combined assembly may have as length of up to about 8000 meters, which may be used, for example, with towing depths of a few to several hundred meters.

In some embodiments, the rigid-stem lead-in assembly 60 may further comprise end connector elements, at either end of rigid-stem lead-in assembly 60. In the illustrated embodiment, the rigid-stem lead-in assembly 60 comprises a male-type end connector element 90 at one end and a female-type end connector element 95 at the opposite end. The end connector elements should be configured for connection to corresponding connector elements (not shown) disposed at the longitudinal ends of adjacent rigid-stem lead-in assemblies. Each of the end connector elements can make mechanical and electrical connection to the corresponding end connector elements on the adjacent rigid-stem lead-in assembly (not shown).

In some embodiments, a flexible cable 100, which may be an electrical or optical conductor, for example, extends between the rigid stems 65. In some embodiments, the flexible cable 100 may conduct a gas, such as air, for maintenance of air volumes, ballasting, and recover, as well as supply to air guns, which may be on the rigid-stem lead-in assembly 60, for example. As illustrated, the flexible cable 100 may extend from either end of the rigid-stem assembly 65 between the connector elements (e.g., from the male-type connector element 90 to the female-type connector element 95). The flexible cable 100 may extend through the interior chamber (e.g., interior chamber 105 shown on FIG. 5) in the rigid stems 65. In some embodiments, the flexible cable 100 may comprise multiple cables extending through the passageway.

While not shown on FIG. 4, sensors, actuators, transducers, and other electronics (e.g., tanks, batteries, etc.) may also be incorporated into the rigid stems 65. Example sensors that may be incorporated include sound/pressure sensors, motion sensors (speed, velocity, and/or acceleration), EM sensors, magnetism (e.g., compass), pressure/depth sensors, tension sensors, surface or bottom echosounders/mappers. Examples of transducers include sound/pressure for acoustic positions, lateral (e.g., to maintain network of positions for several instruments, inline (e.g., bending/water properties), bottom (height) or surface (depth), and electro-magnetic. In some embodiments, one or more actuators may be incorporated into the rigid, stems 105. Example actuators may include control surfaces, ballast tanks, openings, covers/lids, and connection points, among others. For example, control surfaces such as wings) for steering or rotational position may be used. The control surfaces may act to provide depth and/or lateral control for the rigid stems 65. Moreover, the control surfaces may allow the rigid stems 65 to perform a desired move while in the water, such as an undulation, surfacing, diving, rescue, or recovery. Ballast tanks may be also be incorporated that can allow the rigid stems 65 to maintain depth, surface, or compensate for water intrusion, such as by gassing a flooded chamber in a particular rigid stem 65. Openings may also be provided for access to sensor surfaces, ballast, and/or weight/mass center manipulation. Connection points that are openable and/or closable may also be provided in the rigid stems 65, such as valves or ports for feed or transmission lines. Covers/lids that are openable and/or closable may also be provided, which may enable cleaning and/or streamlined handling, for example.

Figure 5:
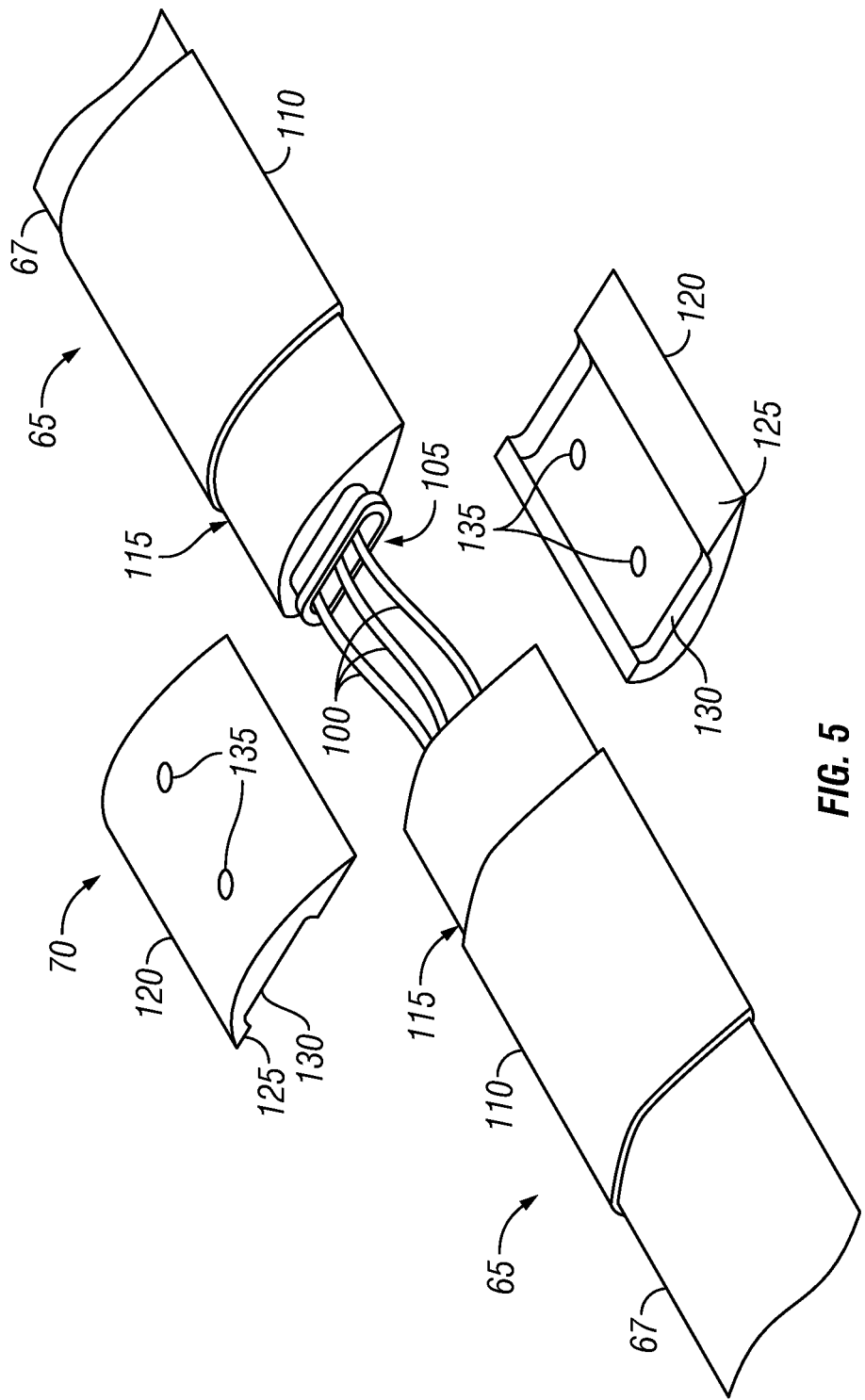
FIG. 5 illustrates coupling of two rigid stems in accordance with embodiments of the present invention.

FIG. 5 illustrates two adjacent rigid stems 65 coupled together by a stem joint 70 in accordance with embodiments of the present invention. To maintain rigidity of the rigid-stem lead-in assembly 60 (e.g., shown on FIGS. 1 and 2), the stem joint 70 may form a rigid connection between the adjacent rigid stems 65. As illustrated, the adjacent rigid stems 65 may each comprise a stem body 67 having an interior chamber 105 with flexible cables 100 extending between the adjacent rigid stems 65 by way of the interior chamber 105. In accordance with present embodiments, sleeves 10 may be used for holding the stem joint 70 in clamping position to couple the adjacent rigid stems 65. The stem body 67 of each of the adjacent rigid stems 65 may have a longitudinal end portion 115 over which the sleeves 110 may be disposed. The sleeves 110 may each be slidably moveable on the corresponding longitudinal end portion 115 to cover the stem joint 70 and hold it in place. While not illustrated, a locking element may be provided for securing the sleeves 110 in locking position. For example, the sleeves 110 may each be spring loaded by a corresponding spring.

The stem joint 70 may comprise two clamp portions 120. The clamp portions 120 should cooperate with one another so that, when the stem joint 70 is assembled, the clamp portions 120 define a rigid-stem passage that receives at least a portion of the longitudinal end portion 115 of each of the adjacent rigid stems 65. In some embodiments, each of the clamp portions 120 may generally have a bent- or C-shaped cross-section. It should be understood that the cross-section of the clamp portions 120 may vary, for example, based on the particular configuration of the adjacent rigid stems 65. The clamp portions 120 may each have an interior surface 125. The interior surfaces 125 may each have axially extending recesses 130 for receiving the end portions 115 of the adjacent rigid stems 65. As illustrated, the clamp portions 120 may have holes 135 for receiving bolts (not shown) to hold the clamp portions 120 in place. In some embodiments, the sleeves 110 may also slide over the ends of the clamp portions 120 to fasten the clamp portions 120 in clamping position to couple the adjacent rigid stems 65. In other embodiments (not illustrated), the clamp portions 120 might go over not only the flexible cables, but also hinges or some other mechanism that could connect the rigid stems 65 while keeping one axis of the flexibility open for folding the stems to be closed by the clamp portions 120.

Embodiments of the present invention are not limited to the stem joint 70 illustrated by FIG. 5. It should be understood that other types of connectors may be used to couple the adjacent rigid stems 65 to one another. Examples of connectors that may be used for the stem joint 70 include, without limitation, a locking nut with inline pin, socket connections, face fibers.

It should be understood that the shape of the cross-section of the rigid stems 65 may vary as desired for as particular application. The rigid stems 65 may have, for example, an oval-, circular-, triangular-, square-, pentagonal-, other polygonal-, wing-, or non-symmetrical-shaped cross-section. FIGS. 6A through 6C illustrate rigid stems 65 having differently shaped cross-sections. FIG. 6A illustrates as rigid stem 65A, having a circular-shaped cross-section. FIG. 6B illustrates a rigid stem 65B having a rectangular-shaped cross-section. FIG. 6C illustrates a rigid stem 65C having a flat or wing-shaped cross-section. The wing-shaped cross-section may be desirable, for example, to reduce the drag, coefficient for the rigid-stem lead-in assembly 60. A reduced drag coefficient may particularly beneficial, for example, where substantial cross-flow may be encountered, such as when coupling a sensor streamer or other towed body in marine surveying. In some embodiments (not illustrated), the wing-shaped cross-section may have an asymmetric wing profile, which may be beneficial, for example, to provide one-side lift. The wing-shaped cross section may have ratio of width W1 to height H1 of greater than about and, alternatively, greater than about 1.5. In some embodiments, the wing-shaped cross section may have a ratio of width W1 to height H1 in a range of from about 1 to about 10. FIGS. 6A through 6C further illustrate the rigid stems 65 having an interior chamber 105, which may include various cables 100, such as electrical or optical cables, for example.

Figure 7:
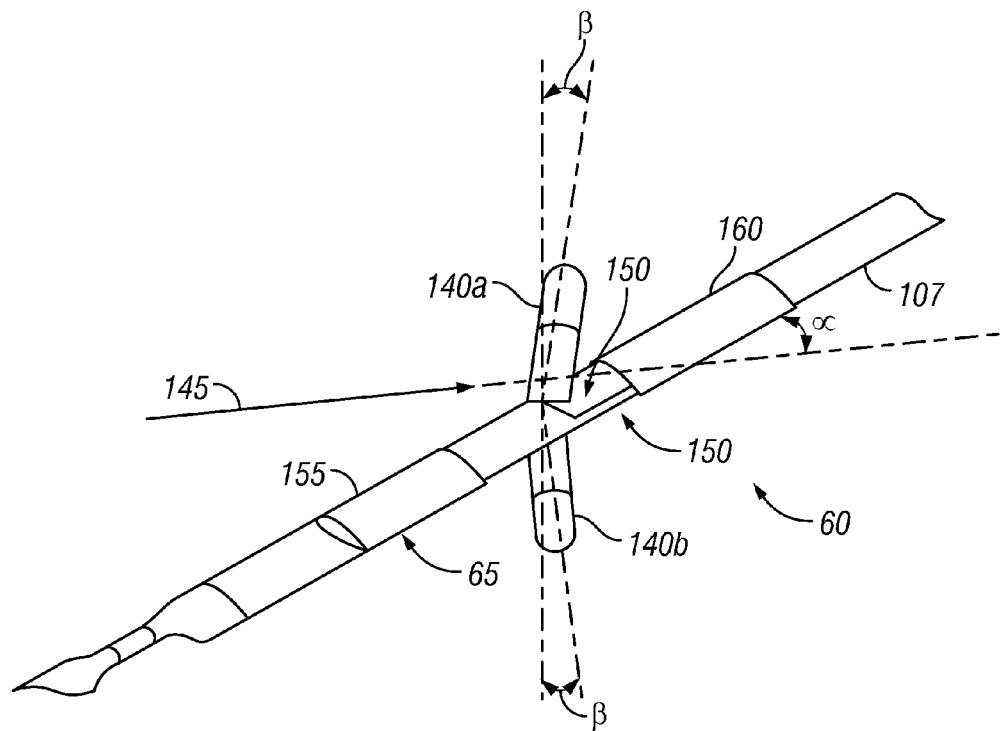
FIG. 7 illustrates a rigid-stem lead-in assembly having substantially vertically extending wings in accordance with embodiments of the present invention.

FIG. 7 illustrates a rigid-steam lead-in assembly 60 in which the rigid stem 65 comprises wings 140a, 140b that extend from the stem body 67, in accordance with embodiments of the present invention. As illustrated, the rigid-steam lead-in assembly 60 may be towed in or close to the horizontal plane, for example. The flow direction is illustrated on FIG. 5 by arrow 145. The lateral angle α of the rigid stem 65 compared to the flow direction 145 may be small close to the path of the survey vessel 10 and larger for the outermost of the lead-ins 50 with a lateral angle α of up to about 60° or greater, in some embodiments.

To provide lateral force and place the forward ends of the respective sensor streamer 45 (e.g., sensor streamers 45a, 45b on FIG. 3) in a selected lateral position, the rigid stem 65 may comprise wings 140a, 140b mounted to the stem body 67. As illustrated, one of the wings 140a, 140b may extend upward from the stem body 67 and one of the wings 140a, 140b may extends downward from the stem body 67. In some embodiments, the wings 140a, 140b may be foldable or retractable. By being able to unfold the wings 140a, 140b into an open position, the rigid-stem assembly 60 may be lift-activated after deployment. In other words, the wings 140a, 140b may be unfolded after deployment into the body of water 15 to move into the selected lateral position. In some embodiments, the stem body 67 may have a rigid-stem cavity 150 for receiving the wings 140a, 140b. In a closed configuration, the wings 140a, 140b may be folded and stored in the rigid-stem cavity 150. To open and close the wings 140a, 140b any of a variety of different suitable techniques may be used. In some embodiments, a wing-covering stem sleeve 155 may cover the wings 140a, 140b retaining them in the rigid-stem cavity 150. In alternative embodiments, the wings 140a, 140b may be opened using hinges or joints (not shown), which may be automated or driven manually, in combination with springs (not shown) for biasing the wings 140a, 140b.

The wing-covering stem sleeve 155 may be disposed over at least a portion of the stem body 67 and be slidably moveable on the stem body 67. For example, the wing-covering stem sleeve 155 may be configured to move on the stem body 67 and uncover the wings 140a, 140b. A thread screw or other suitable mechanism (not shown) may be used to drive the wing-covering stem sleeve 155. :In some embodiments, the wings 140a, 140b may be biased, for example, by a spring (not shown) so that uncovering the wings 140a, 140b should cause the wings 140a, 140b to open. To close the wings 140a, 140b, the wing-covering stem sleeve 155 may be slid back over the wings 140a, 140b to cause the wings to fold back into the rigid-stem cavity 150. The rigid stem 65 may further comprise a wing-cavity stem sleeve 160 disposed over at least a portion of the stem body 67 and slidably moveable on the stem body 67. The wing-cavity stem sleeve 160 may be moved to cover the wing cavity 150, for example, to prevent drag caused by having an opening in the rigid stem 65. The wing-covering stem sleeve 155 and the wing-cavity stem sleeve 160 may have the same shape as the stem body 67, for example, to reduce drag on the rigid-stem lead-in assembly 60.

In alternative embodiments (not shown), the wings 140a, 140b may be mounted on the stem body 67 at deployment from the survey vessel 10 and removed from the stem body 67 at retrieval from the body of water 15. For example, the wings 140a, 140b may be mounted on the stem body 67 by way of a snap-on connection not shown) or other suitable connection mechanism.

The wings 140a, 140b may be mounted on the stem body 67 such that the wings 140a, 140b extend at an angle β from vertical with respect to flow direction 145. In this manner, the wings may provide lateral lift as they are moved through the body of water 15. For example, the wings may be at angle β of less about 90°, alternatively, less than about 45°, and alternatively, less than about 10°. As illustrated, the wings 140a, 140b may be considered to be vertical as they extend vertically or an angle β from vertical with respect to the flow direction 145. In some embodiments, the wings 140a, 140b may be fixed at the angle β. In alternative embodiments, the wings 140a, 140b may be coupled to the stem body 67 such that the wings 140a, 140b may be moved, for example, to any angle β. For example, the wings 140a, 140b may be mounted to the stem body 67 by an axle (e.g., axle 165 on FIG. 8) that can be actuated to move the wings 140a, 140b to the angle β. In other embodiments, the wings 140a, 140b may be mounted on an axle that freely rotates. A freely rotating axle should achieve greater lateral-force-to-drag ratios and, thus, be more efficient in spreading the sensor streamers 45. In addition, a freely rotating axle may enable the same wings 140a, 140b to be used in different locations of the rigid-stem assembly 60 and in any one of the lead-ins 50, as they can be used in various angles β. The angle β can in other embodiments be actuated or driven by the opening/closing mechanism to change the angle β continuously or in steps to enable active steering of lift and, thereby, depth and offset of the entire towed assembly dynamically.

While FIG. 7 illustrates only as single rigid stem 65 it should be understood that two or more rigid stems 65 each having wings 140a, 140b may be employed, in a rigid-stem assembly 60 in accordance with embodiments of the present invention. To vary the lateral lift generated by the wings 140a, 140b, the wings 140a, 140b on as subset of the rigid stems 65 may be opened. In some embodiments, the rigid-stem assembly 60 may be become engaged with an undesired object, such as fishing gear, debris, or ropes that are in the body of water 15. To disengage the object, the wings 140a, 140b on successive rigid stems 65 may be closed until the object has become disengaged. Depending on the proximity to the sensor streamer 45 and the desired lateral position, different angles β may be selected for the wings 140a, 140b on each of the rigid stems 65. Accordingly, example embodiments may include different angles β used for the rigid stems 65 on the same one of the lead-ins while additional example embodiments may include different angles β for the rigid stems 65 on different lead-ins 50. It should be understood that less wings 140a, 140b may be needed on the particular rigid-stem lead-in assemblies 60 coupled to the innermost of the lead-ins 50 as less lateral lift may be needed, for example.

Figure 8:
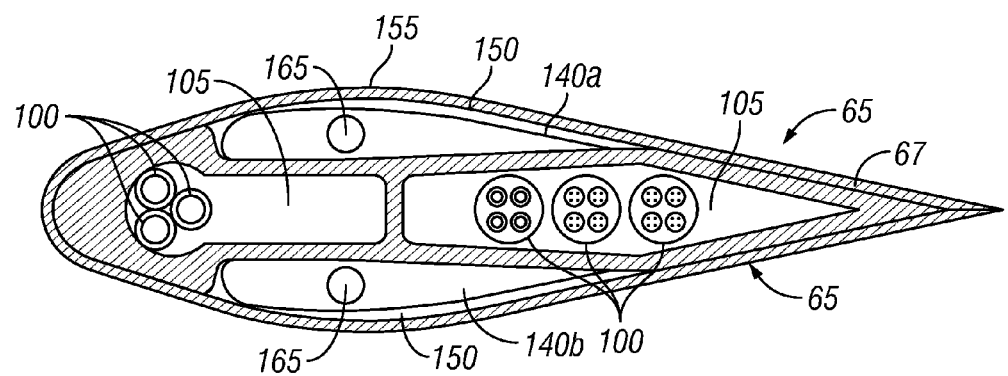
FIG. 8 illustrates a cross-section of the rigid-stem lead-in assembly of FIG. 5 with the wings folded into the rigid stem in accordance with embodiments of the present invention.

A cross-sectional view of a rigid stem 65 having wings 140a, 140b mounted to the stem body 67 is shown on FIG. 8 in accordance with embodiments of the present invention. The wings 140a, 140b are each shown folded in the corresponding rigid-stem cavity 150. As illustrated, the wing-covering sleeve 155 may be disposed over at least a portion of the stem body 67 and can cover the wings 140a, 140b, for example, to hold each of the wings 140a, 140b in the corresponding rigid-stem cavity 150. In the illustrated embodiment, the wings 140a, 140b are mounted to stem body 67 by axle 165. The axle 165 may be fixed or freely rotating, for example. The stem body 67 may also define one or more interior chambers 105 wherein various components may be installed, such as cables 100. While not shown, sensors, actuators, transducers, and other devices (e.g., tanks, batteries, etc.) may also be incorporated into the interior chambers 105.

Example embodiments of the rigid stem 65 may comprise one or more attachments or devices for depth control. For example, horizontal wings, ailerons, ballast tanks, or other devices known to those of ordinary skill in the art may be used for depth control. In some embodiments, the rigid stem 65 may comprise, substantially horizontal wings that extend from the stem body 67. The substantially horizontal wings may be configured to provide vertical lift as the rigid stem 65 is moved through the body of water 15.

Figure 9:
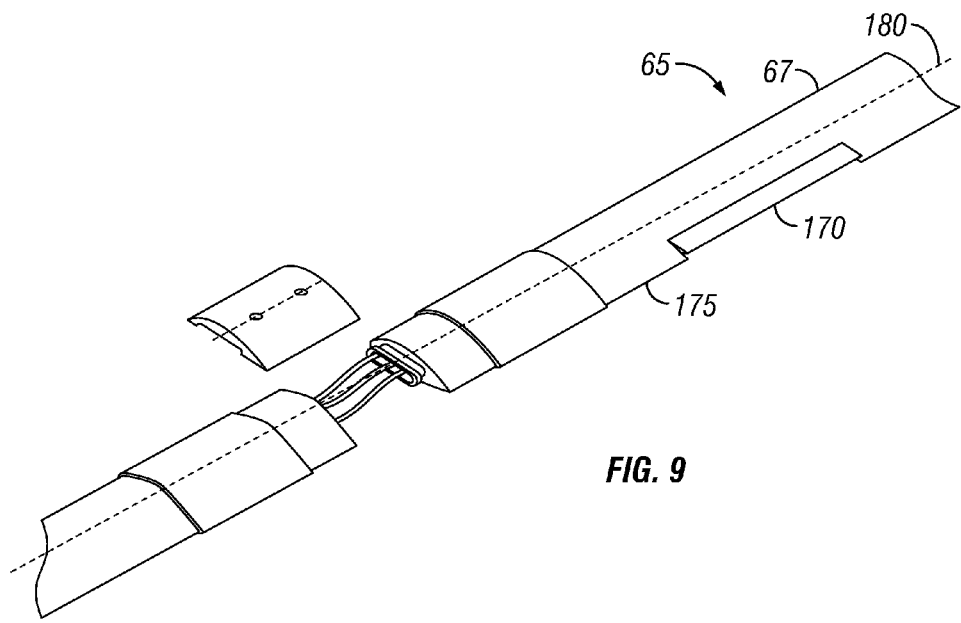
FIG. 9 illustrates a rigid-stem lead-in assembly having an aileron attached to the stem body in accordance with embodiments of the present invention.

FIG. 9 illustrates a rigid stem 65 comprising at least one aileron 170 attached to the edge 175 of the stem body 67 in accordance with some embodiments. As illustrated, the aileron 170 may extend longitudinally in a direction that is generally parallel to longitudinal axis 180 of the rigid stem 65. In addition to providing vertical lift, the aileron 170 may also be configured to control rotation of a rigid-stem assembly in which the rigid stem 65 may be incorporated. For example, the angle of the aileron 170 may be adjusted to control rotation.

Figure 10:
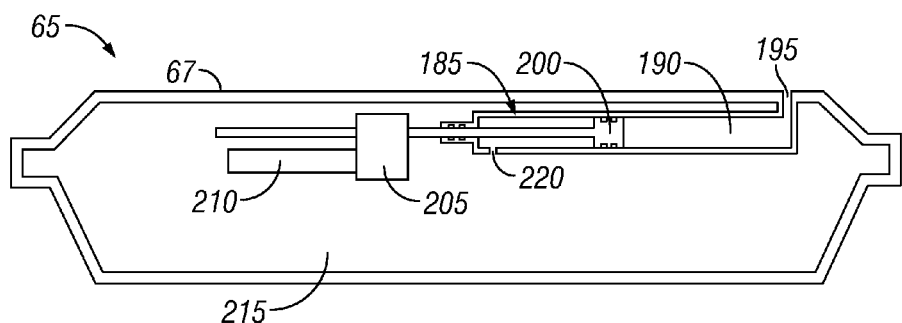
FIG. 10 illustrates a rigid-step lead-in assembly having a ballast tank disposed in the stem body in accordance with embodiments of the present invention.

FIG. 10 illustrates an embodiment of a rigid stem 65 comprising at least one ballast tank 185 disposed in the stem body 67. As illustrated, the ballast tank 185 has an interior volume 190 in fluid communication with first port 195. In some embodiments, a piston 200 may also be disposed in the ballast tank 185. The piston 200 may be operably coupled to a linear drive 205 and a motor 210. The linear drive 205 may operate, for example, to convert mechanical energy generated by the motor 210 to produce a straight line force such that the piston 200 can move longitudinally within the ballast tank 185. In some embodiments, the interior volume 190 of the ballast tank 185 may contain seawater. Water may be drawn into or expelled from the interior volume 190, for example, to control depth. At a desired time, the seawater may be expelled from the ballast tank 185 via the first port 195. To expel water from the ballast tank 185, the motor 210 may be used to move the piston 200, thus forcing water from the interior volume 190 through the first port 195. Air from interior chamber 215 of the stem body 67 should fill the interior volume 190 as the seawater is expelled. The piston 200 may be moved in an opposite direction, for example, to draw water into the interior volume 190. As illustrated, the interior volume 190 of the ballast tank 185 may be in fluid communication with the interior chamber 215 via second port 220. In other embodiments (not illustrated), other types of ballasting using, for example, elastic membranes or other methods of changing volume or mass of chambers by pumping or actuation, may be used as will be appreciated by those of ordinary skill in the art.

Figure 11:
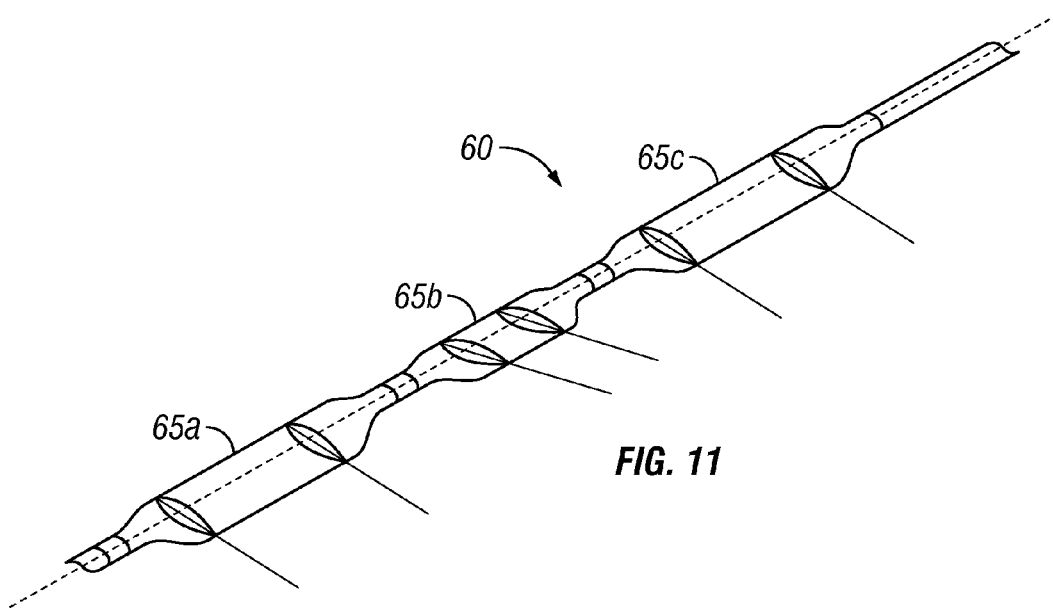
FIG. 11 illustrates rotation of a rigid stem to a different the adjacent rigid stems in accordance with embodiments of the present invention.

FIG. 11 illustrates an embodiment showing a segment of a rigid-stem lead-in assembly 60 having three rigid stems 65a, 65b, 65c. As illustrated, rigid stem 65b is disposed between the other two rigid stems 65a, 65c. In example embodiments, the rotation of the rigid stems 65b may be controlled using, for example, wings (e.g., wings 140a, 140b shown on FIG. 7) so only rigid stem 65b is rotated to generate lift. In this manner, the middle rigid stem 65b by a different angle than the outer rigid stems 65a, 65c, whereby lift may be generated to force down the rigid-stem lead-in assembly 60, for example.

Accordingly, embodiments may include using a rigid-stem lead-in assembly comprising a plurality of interconnected rigid stems in a marine seismic survey. Some advantages of employing the rigid-stem lead-in assembly may include one or more of the following. One of the many potential advantages is that embodiments of the rigid-stem lead-in assemblies may be configured to have a stream-lined, low-drag profile for drag reduction as the rigid-stem lead-in assembly is towed, which may result in reduced tension in the lead-in assembly, reduced strumming, and lower fuel consumption for the survey vessel, for example. Another potential advantage is that exampled embodiments of the rigid-stem lead-in assemblies may have a larger interior volume as compared to the previously used cables, thus providing larger buoyancy while also making the rigid-stem lead-in assemblies particularly advantageous for embodiments where sensors, actuators, transducers, and other devices (e.g., tanks, batteries, etc.) may be incorporated into the rigid stems without needs for separate housings, seals, and penetrators, for example. Yet another one of the many potential advantages is that due to the layout of the cable inside the rigid stems and their handling, the inside cable can be positioned behind each other rather than around each other, thus leading to reduced height of the assembly with potentially lower drag. Yet another one of the many potential advantages is that due to their increased rigidity, embodiments of the rigid-stem assemblies should be less susceptible to rotation and tangling, which can be beneficial for lead-ins. Yet another one of the many potential advantages is that embodiments may not use a surface reference commonly used with spreading devices, such as trawl doors, thus reducing potential interference with other vessels. Yet another one of the many potential advantages is that the stiffness of the rigid-stem lead-in assembly should provide less position change as potential rotation of the lead-in may be reduced. Yet another one of the many potential advantages may come from flexibility of having many rigid-stem lead-in assemblies, each coupled to its own sensor streamer or other towed body combined with the flexibility of each with different wing settings of control of wings, ballast or other, able to selectively position each of the rigid-stem lead-in assemblies, thus potentially reducing the need for lateral ropes between each sensor streamer and allowing replacement of a single sensor streamer/lead-in without the need to cease operation of the others.

Figure 12:
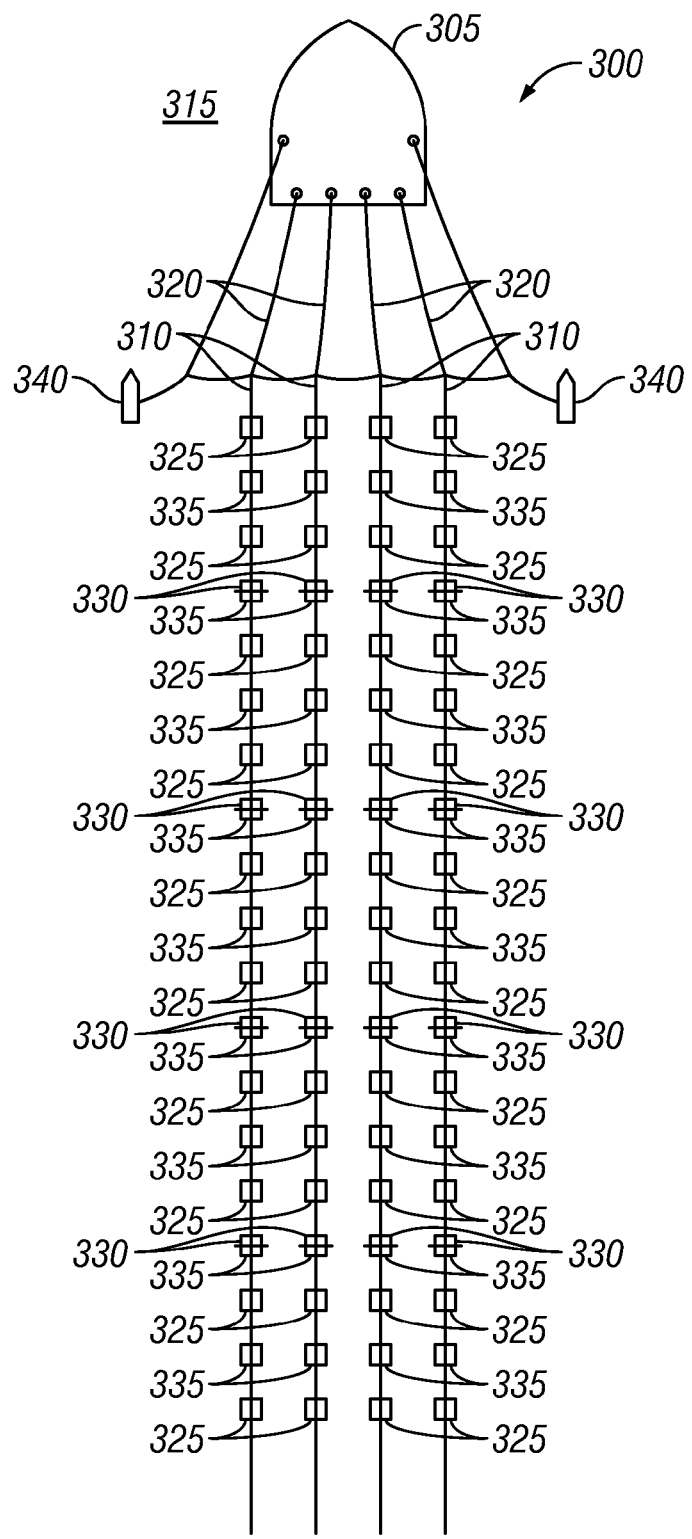
FIG. 12 illustrates a conventional seismic survey system.

In contrast to systems that use rigid-stem lead-in assemblies comprising a plurality of interconnected rigid stems in a marine survey. FIG. 12 illustrates a conventional seismic survey system 300. As illustrated, the seismic survey system 300 may include a survey vessel 305 towing a plurality of sensor streamers 310 through a body of water 315. Lead-in lines 320 may be used to couple the sensor streamers 310 to the survey vessel 305. Each of the sensor streamers 310 may include sensors 325. The sensor streamers 305 may also include lateral force and depth ("LFD") control devices 330 (e.g., "birds") and associated acoustic range sensing devices 335, which can be disposed at selected positions along the sensor streamers 305 collocated with the LDF devices 330 or at separate positions. Spreading devices 340, such as doors or paravanes, may be used to maintain lateral separation of the sensor streamers 305. Unlike the system illustrated by FIG. 12, embodiments of the present invention that use rigid-stem lead-in assemblies in a survey may contain almost no buoys, doors, paravanes, chains or extra ropes, or LFD devices, such as birds. For example, a seismic survey may be performed that only has the desired lights and antennas above the water.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A method of towing a survey device from a survey vessel, comprising:
coupling the survey device to the survey vessel with a lead-in comprising a rigid-stem lead-in assembly, the rigid-stem lead-in assembly comprising a plurality of rigid stems that are interconnected and each comprise a stem body defining one or more interior chambers; and
towing the survey device through a body of water.

2. The method of claim 1, further comprising coupling stem joints between the plurality of the rigid stems to form a rigid connection between adjacent stem joints, wherein one or more flexible cables extend between the plurality of rigid stems.

3. The method of claim 2, further comprising coupling the rigid-stem lead-in assembly to a second rigid-stem lead-in assembly, the second rigid-stem lead-in assembly comprising a plurality of interconnected rigid stems each comprising a stem bodying defining one or more interior chambers.

4. The method of claim 1, further comprising generating signals with sensors located on the sensor streamer in response to energy emitted from one or more energy sources.

5. The method of claim 1, further comprising expelling seawater from at least one ballast tank disposed in the stem body of at least one of the rigid stems.

6. The method of claim 1, further comprising adjusting an angle of an aileron attached to an edge of the stem body of at least one of the rigid stems to control rotation of the rigid stem.

7. The method of claim 1, wherein at least one of the rigid stems comprises a wing mounted to the stem body, and wherein the method further comprising deploying the wing into an open position.

8. The method of claim 7, wherein the deploying comprises sliding a sleeve on the stem body to release the wing.

9. The method of claim 1, wherein each of the rigid stems has a length in a range of from about 1 meter to about 50 meters.

10. The method of claim 1, wherein the stem body for at least one of the rigid stems has a wing-shaped cross-section.

11. A marine geophysical survey method, comprising:
towing at least one sensor streamer through a body of water, the sensor streamer coupled to a survey vessel with one or more rigid-stem lead-in assemblies each comprising a plurality of rigidly interconnected rigid stems, the rigid stems each comprising a stem body defining one or more interior chambers; and
generating signals with geophysical sensors located on the sensor streamer in response to energy emitted from one or more energy sources.

12. The method of claim 11, further comprising coupling stem joints between the plurality of the rigid stems on one of the rigid-stem lead-in assemblies to form a rigid connection between adjacent stem joints, wherein one or more flexible cables extend between the plurality of rigid stems.

13. A marine survey system, comprising:
a survey vessel;
a lead-in coupled to the survey vessel, wherein the lead-in comprises a rigid-stem assembly the rigid-stem lead-in assembly comprising a plurality of rigid stems that are interconnected, each of the rigid stems comprising a stem body defining one or more interior chambers; and
a survey device coupled to the survey vessel by the lead-in.

14. The system of claim 13, wherein each of the rigid stems has a length in a range of about 3 meters to about 12.5 meters.

15. The system of claim 13, wherein the rigid-stem lead-in assembly is characterized as having a bending stiffness of 700 $Nm^2$ over a length of at least about 25 meters.

16. The system of claim 13, wherein the rigid-stem lead-in assembly is rigid for a length of at least about 25 meters, the rigid-stem lead-in assembly having a length in a range of from about 50 meters to about 1000 meters and having a smallest width or height of about 1 meter or less.

17. The system of claim 13, wherein the rigid-stem lead-in assembly further comprises a plurality of stem joints that rigidly interconnect at least a portion of the rigid stems.

18. The system of claim 13, wherein the stem body for at least one of the rigid stems has a wing-shaped cross-section.

19. The system of claim 13, wherein at least of the rigid stems comprises a wing mounted to the corresponding stem body.

20. The system of claim 13, wherein at least one of the rigid stems comprises an aileron attached to an edge of the corresponding stem body.

21. The system of claim 13, wherein the survey device comprises a sensor streamer, wherein the sensor streamer comprises at least one sensor selected from the group consisting of: seismic sensors, electromagnetic field sensors, and any combination thereof.

22. The system of claim 13, wherein the survey device comprises at least one device selected from the group consisting of a sensor streamer, an energy source, a sensor assembly, a transducer, and any combination thereof.

* * * * *